July 30, 1957 P. A. NEETESON 2,801,336
CIRCUIT-ARRANGEMENTS FOR SYNCHRONIZING AN OSCILLATOR
Filed Nov. 15, 1952
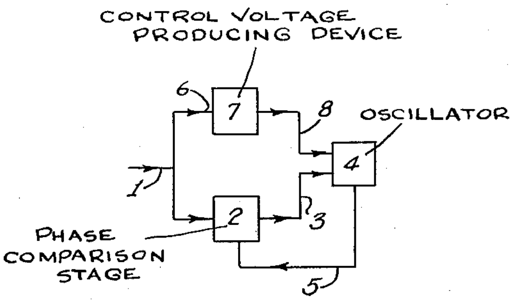
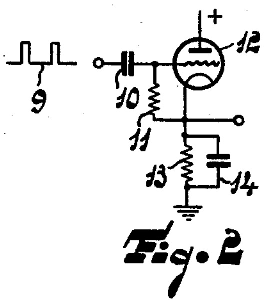
Fig. 1
Fig. 2
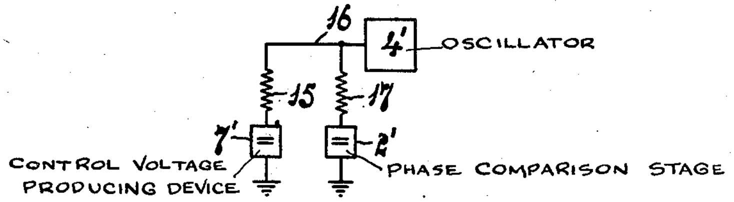
Fig. 3
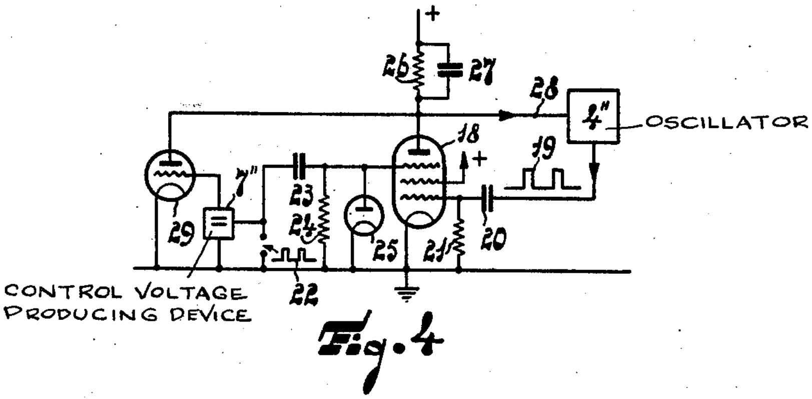
Fig. 4
INVENTOR
PIETER ADRIANUS NEETESON
BY [signature]
AGENT United States Patent Office 2,801,336

Patented July 30, 1957

2,801,336

CIRCUIT-ARRANGEMENTS FOR SYNCHRONIZING AN OSCILLATOR

Pieter Adrianus Neeteson, Eindhoven, Netherlands, assignor, by mesne assignments, to North American Philips Company, Inc., New York, N. Y., a corporation of Delaware Application November 15, 1952, Serial No. 320,708

Claims priority, application Netherlands December 18, 1951

3 Claims. (Cl. 250—36)

The invention relates to a circuit-arrangement for synchronizing an oscillator with a control-oscillation, in which oscillations derived from the oscillator and from the control-oscillation are supplied to a phase-comparison stage, the output voltage of which controls the oscillator frequency.

Such known circuit-arrangements for automatic frequency-control and phase-control have various favorable properties.

The oscillator frequency, for example, is comparatively insensitive to noise or other interference signals in the control-oscillation.

Moreover, the oscillation of the oscillator remains synchronous with the control-oscillation, provided that the tendency of the natural frequency of the oscillator to vary, for example, due to temperature fluctuations or fluctuations of the supply voltage, or the variation of the frequency of the control-oscillation is not excessively great.

If the natural frequency of the oscillator tends to vary, a variation of the relative phases of the oscillation of the oscillator and the control-oscillation occurs, since a variation of the natural frequency of the oscillator produces a variation of the output voltage of the phase-comparison stage; this voltage variation compensates the variation of the natural frequency of the oscillator.

Such a variation of the relative phases of the control-oscillation and the oscillation of the oscillator also occurs, if the frequency of the control-oscillation varies. In order to maintain synchronism the oscillator frequency must vary, which occurs owing to the variation of the output voltage of the phase-comparison stage, which gives rise to phase displacement.

This phase displacement may have a disturbing effect. Such is the case, for example, with television receivers in which the horizontal deflection of the beam in the cathode-ray tube is synchronized with the use of an automatic frequency-control or phase-control circuit.

If in this case the incoming television signal originates from a television transmitter in which the frequency of the line-synchronizing pulses is coupled with the frequency of the supply mains of the transmitter, fluctuations of the mains frequency produce fluctuations of the line-synchronizing frequency, so that phase displacements between the line-synchronizing pulses and the horizontal-deflection oscillations occur in the receiver and hence shifts in the image on the reproducing screen of the cathode-ray tube of the receiver occur.

The circuit-arrangement according to the invention has for its object to reduce the phase displacements between the oscillation of the oscillator and the control-oscillation, due to variation of the frequency of the control-oscillation.

The circuit-arrangement according to the invention has the feature that a control-voltage, which is proportional to the frequency of the control-oscillation, is supplied to the oscillator in addition to the output voltage of the phase-comparison stage.

In one embodiment of the circuit-arrangement in accordance with the invention the control-voltage proportional to the frequency of the control-oscillation and the output voltage of the phase-comparison stage are supplied in common to the oscillator.

In order that the invention may be readily carried into effect, it will now be described in detail with reference to the accompanying drawing wherein:

Fig. 1 is a schematic diagram, in block diagram form, of an embodiment of the circuit arrangement of the present invention;

Fig. 2 is a schematic diagram of an embodiment of a circuit for producing a control voltage proportional to the frequency of the control oscillation;

Fig. 3 is a schematic diagram of an embodiment of the oscillator feeding portion of the circuit arrangement of the present invention; and Fig. 4 is a detailed schematic diagram of another embodiment of the oscillator feeding portion of the circuit arrangement of the present invention.

In the circuit-arrangement shown in Fig. 1 the control-oscillation is supplied at 1 and fed to the phase comparison stage 2.

The output voltage of the phase-comparison stage 2 is supplied via the lead 3 to the oscillator 4.

An oscillation taken from the oscillator 4 is supplied through the lead 5 to the phase-comparison stage 2.

The circuit-arrangement so far described is of known kind and, in accordance with the shape of the control-oscillation and with the shape of the oscillation produced by the oscillator, it may be constructed in various known ways.

According to the invention the control oscillation is supplied via the lead 6 to a control voltage producing device 7, which produces a control-voltage which is proportional to the frequency of the control-oscillation.

The control voltage is supplied via the lead 8 to the oscillator 4.

In the circuit-arrangement shown in Fig. 1, if the frequency of the control-oscillation varies, the frequency of the oscillator 4 is adjusted, if the control voltage producing device 7 is not provided, since the output voltage of the phase-comparison stage 2 varies. Thus phase-displacement takes place between the control-oscillation and the oscillation of the oscillator.

If the control voltage producing device 7 is provided, the control-voltage produced by said device varies, so that the oscillation of the oscillator is adjusted. With a correct choice of the value of the control-voltage variation, the desired variation of the oscillator frequency is substantially obtained by the control voltage producing device 7, only, and the output voltage of the phase-comparison stage 2 varies little or not at all.

It should be noted that the phase-comparison stage 2 usually has a comparatively long time constant, so that the first control operates slowly, whereas the time constant of the control voltage producing device 7 may preferably be shorter, so that the second control is carried out more rapidly.

Fig. 2 is a schematic diagram of an embodiment of a circuit for producing a control voltage proportional to the frequency of the control oscillation. It is a suitable control voltage producing device 7 if the control oscillation comprises pulses.

The pulsatory control-oscillation 9 is supplied via a capacitor 10 and a grid-leak resistor 11 to the control grid of a discharge tube 12. The cathode lead of this tube comprises the parallel combination of a resistor 13 and a capacitor 14; from this parallel combination the control-voltage proportional to the frequency of the control-oscillation is taken.

The grid space of the tube 12 co-operates with the capacitor 10 and the resistor 11 as a peak detector, so that the tube is traversed by current only when a pulse occurs at the control grid.

The network 13, 14 has a time constant which is a few times longer than the duration of one period of the control-oscillation.

If the frequency of the control-oscillation 9 varies, the duration of the pulses being the same, the control-voltage across the network 13, 14 varies proportionally.

If at the same time the duration of the pulses varies, the control-oscillation must be first converted in known manner, for example with the use of a differentiating network, into a new pulsatory signal, of which only the frequency varies and the shape of the pulse remains the same.

Since in most circuit-arrangements the control-voltage supply is on one side at a definite potential, for example, connected to ground, series combination of the control-voltages is frequently impossible. The control voltages may, however, be applied to the oscillator in common.

Fig. 3 is a schematic diagram of an embodiment of the oscillator feeding portion of the circuit arrangement of the present invention. The control voltage sources are in parallel connection and feed the oscillator through a common connection. The control voltage produced by the control voltage producing device 7′, which is proportional to the frequency of the control-oscillation, is supplied through a resistor 15 and a lead 16 to the oscillator 4′. The output voltage of the phase comparison stage 2′ is supplied to the oscillator 4′ through a resistor 17 and the lead 16.

If the control-voltage produced by the control voltage producing device 7, of Fig. 1, is excessively low or if it has the wrong polarity, so that it is necessary to employ direct-current amplification, use may be made of the circuit of Fig. 4.

Fig. 4 is a detailed schematic diagram of another embodiment of the oscillator feeding portion of the circuit arrangement of the present invention. The phase-comparison stage comprises a discharge tube 18. A pulsatory voltage 19, produced by the oscillator 4″, is supplied through a capacitor 20 and a leak resistor 21 to the first control grid of the tube 18, peak detection thus occurring in known manner.

The control-oscillation 22, which is also pulsatory, is supplied through a capacitor 23 and a resistor 24, to the third grid of the tube 18; a diode 25, having the polarity indicated in the figure, is connected in parallel with the resistor 24.

The anode circuit of the tube 18 includes an integrating network comprising the parallel combination of a resistor 26 and a capacitor 27.

As is known, a control-voltage is produced across the network 26—27; the value of said control voltage is determined by the phase relation of the pulsatory voltages 19 and 22. The control-voltage is supplied via the lead 28 to the oscillator 4″.

The control-oscillation 22 is also supplied to the control voltage producing device 7″, in which a control-voltage proportional to the frequency of the control-oscillation is produced. The control-voltage obtained, which is excessively low and has the wrong polarity, is supplied to the control grid of an electron tube 29. The tube 29 functions as a direct-current amplifier; its anode being connected to the anode of the tube 18.

Therefore both the frequency dependent control-voltage produced by the control voltage producing device and the control-voltage produced by the phase-comparison stage occur across the common anode circuit of the tubes 18 and 29.

It is to be understood that the invention is not limited to the details disclosed but includes all such variations and modifications as fall within the spirit of the invention and the scope of the appended claims.

What I claim is:

1. In a circuit for synchronizing a local oscillator in accordance with a control-oscillation; the combination comprising a phase comparison stage including a first electron discharge device having an anode and first and second control grids, and a common output circuit connected to said anode; means to apply said control-oscillation to said first grid, means to apply a second oscillation derived from said local oscillator to said second grid to compare in phase with said control-oscillation to produce a first control voltage depending on the phase difference therebetween, means for deriving a second control voltage proportional to the frequency of said control-oscillation therefrom, an amplifying stage including a second electron discharge device having an anode and a control electrode, means to apply said second control voltage to said control electrode, means to interconnect said anodes, and means to apply the voltage from said common output circuit to said local oscillator to effect said synchronism.

2. In a circuit for synchronizing a local oscillator in accordance with a control-oscillation comprising a series of synchronizing pulses; the combination comprising a phase-comparison stage, means to apply said control-oscillation as an input to said stage, means to apply a second oscillation derived from said local oscillator as another input to said stage to compare in phase with said control-oscillation to produce a first control voltage depending on the phase difference therebetween, means coupled to said stage to apply said control voltage to said oscillator to effect said synchronism, means for deriving a second control voltage proportional to the frequency of said control-oscillation therefrom, the time constant of said phase-comparison stage being larger than the time constant of said second control voltage deriving means, said second control voltage being a direct voltage, and means to apply said second control voltage to said oscillator to effect said synchronism.

3. In a circuit for synchronizing a local oscillator in accordance with a control-oscillation comprising a series of uniform synchronizing pulses; the combination comprising a phase-comparison stage, means to apply said control-oscillation as an input to said stage, means to apply a second oscillation derived from said local oscillator as another input to said stage to compare in phase with said control-oscillation to produce a first control voltage depending on the phase difference therebetween, means coupled to said stage to apply said control voltage to said oscillator to effect said synchronism, means for deriving a second control voltage proportional to the frequency of said control-oscillation therefrom including an electron discharge device having a cathode and a control grid, a first resistor connected between said cathode and said grid, a first capacitor, means for applying said uniform pulses through said capacitor to the junction of said resistor and grid, and an output circuit coupled to said cathode, said output circuit including a second resistor and a second capacitor connected thereacross and having a time constant which is a few times longer than the duration of one period of the control oscillation, said second control voltage being a direct voltage, and means to apply said second control voltage to said oscillator to effect said synchronism.

References Cited in the file of this patent

UNITED STATES PATENTS

| | | |
|---|---|---|
| 2,354,510 | Earp | July 25, 1944 |
| 2,433,350 | Earp | Dec. 30, 1947 |
| 2,474,354 | Guanella | June 28, 1949 |
| 2,588,743 | McCallum | Mar. 11, 1952 |
| 2,662,214 | Hugenholtz | Dec. 8, 1953 |